United States Patent
Pastouchenko et al.

(10) Patent No.: US 10,458,336 B2
(45) Date of Patent: Oct. 29, 2019

(54) APPARATUS INCLUDING HEAT EXCHANGER AND SOUND ATTENUATOR FOR GAS TURBINE ENGINE

(71) Applicant: GENERAL ELECTRIC COMPANY, Schenectady, NY (US)

(72) Inventors: Nikolai N. Pastouchenko, Glenville, NY (US); Carlos Enrique Diaz, Garching bei Muenchen (DE); Umesh Paliath, Clifton Park, NY (US); Hongbin Ju, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 15/431,301

(22) Filed: Feb. 13, 2017

(65) Prior Publication Data
US 2018/0230911 A1 Aug. 16, 2018

(51) Int. Cl.
*F02C 7/24* (2006.01)
*F01D 25/24* (2006.01)
(Continued)

(52) U.S. Cl.
CPC .......... *F02C 7/24* (2013.01); *F01D 25/24* (2013.01); *F02C 7/14* (2013.01); *F02K 3/06* (2013.01);
(Continued)

(58) Field of Classification Search
CPC .... F02C 7/24; F02C 7/14; F02C 7/045; F01D 25/24; F05D 2260/213; F05D 2260/22141;
(Continued)

(56) References Cited

U.S. PATENT DOCUMENTS 5,492,195 A * 2/1996 Zink .................. F02C 7/24 181/264
7,300,244 B2 * 11/2007 Baugh ................ F04D 29/281 415/119
(Continued)

FOREIGN PATENT DOCUMENTS

| CN | 2849552 Y | 12/2006 |
| EP | 3038101 A1 | 6/2016 |
| FR | 3028019 A1 | 5/2016 |

OTHER PUBLICATIONS

Jassem, Raaid R. "Effect the Form of Perforation on the Heat Transfer in the Perforated Fins" Academic Research International. 4:3 May 2013, p. 198-207. (Year: 2013).*
(Continued)

*Primary Examiner* — Richard A Edgar
*Assistant Examiner* — Topaz L. Elliott
(74) *Attorney, Agent, or Firm* — Armstrong Teasdale LLP

(57) ABSTRACT

An apparatus for attenuating sound waves in a gas turbine engine includes a surface at least partially defining a pathway for airflow and a plurality of fins extending from the surface. The plurality of fins are configured to dissipate heat into the airflow. Each fin of the plurality of fins includes a fin surface. The fin surface is configured to direct the sound waves between the plurality of fins such that the plurality of fins attenuate the sound waves. The plurality of fins are arranged such that spacing between adjacent fins of the plurality of fins facilitates sound attenuation.

17 Claims, 5 Drawing Sheets

(51) Int. Cl.
    *F02C 7/14*          (2006.01)
    *F02K 3/06*          (2006.01)

(52) U.S. Cl.
    CPC .... *F05D 2220/36* (2013.01); *F05D 2250/191* (2013.01); *F05D 2250/23* (2013.01); *F05D 2250/232* (2013.01); *F05D 2250/314* (2013.01); *F05D 2250/75* (2013.01); *F05D 2260/213* (2013.01); *F05D 2260/22141* (2013.01); *F05D 2260/96* (2013.01); *F05D 2260/963* (2013.01)

(58) Field of Classification Search
    CPC ........... F05D 2260/96; F05D 2260/963; F04D 29/663; F04D 29/664; G10K 11/00–36; F02K 1/822; F02K 1/827
    USPC .................................................. 415/119, 177
    See application file for complete search history.

(56) References Cited

U.S. PATENT DOCUMENTS

| | | | |
|---|---|---|---|
| 7,481,616 B2 * | 1/2009 | Tamagawa | F04D 29/283 |
| | | | 415/119 |
| 8,333,552 B2 | 12/2012 | Wood et al. | |
| 8,544,531 B2 | 10/2013 | Scott et al. | |
| 8,702,378 B2 | 4/2014 | Foster | |
| 9,404,417 B2 | 8/2016 | Norrick et al. | |
| 9,599,410 B2 * | 3/2017 | Antel, Jr. | B23P 15/26 |
| 10,062,826 B2 * | 8/2018 | Casey | F01N 5/025 |
| 2010/0155016 A1 | 6/2010 | Wood et al. | |
| 2012/0055653 A1 * | 3/2012 | Chen | F04D 29/441 |
| | | | 165/121 |
| 2016/0017810 A1 | 1/2016 | Lord et al. | |
| 2016/0115864 A1 * | 4/2016 | Campbell | F02C 7/14 |
| | | | 29/888.012 |
| 2016/0153658 A1 | 6/2016 | Xu | |
| 2017/0292795 A1 * | 10/2017 | Waissi | F02C 7/12 |
| 2019/0040795 A1 * | 2/2019 | Regnard | F02K 1/827 |

OTHER PUBLICATIONS

This Crazy Land Art Deflects Noise from Amsterdam's Airport, Smithsonian.com, retrieved Jan. 25, 2017, 3 pages.
Parker, Acoustic Resonances in Passages Containing Banks of Heat Exchanger Tubes. Journal of Sound and Vibration, Mar. 22, 1978, vol. 57, Issue 2, pp. 245-260.
Min, J. et al., High Temperature Heat Exchanger Studies for Applications to Gas Turbines, Heat Mass Transfer, 2009, vol. 46, pp. 175-186.

* cited by examiner

US 10,458,336 B2

APPARATUS INCLUDING HEAT EXCHANGER AND SOUND ATTENUATOR FOR GAS TURBINE ENGINE

BACKGROUND

The field of the disclosure relates generally to gas turbine engines and, more specifically, to systems and methods for reducing noise and transferring heat in gas turbines using an apparatus including a heat exchanger and a sound attenuator.

During operation of at least some known gas turbine engines, such as turbofans, air is mixed with fuel and ignited to form a high energy gas stream to rotatably drive a turbine. However, the high energy gas stream increases the temperature of components of the gas turbine engines, which reduces the service life and reliability of the components. Accordingly, at least some known gas turbine engines include heat exchangers to control the temperature of the components. For example, in at least some known gas turbine engines, heat exchangers are located within a fan duct of the turbofan engine.

In addition, gas turbine engines generate sound during operation. Accordingly, at least some known gas turbine engines include an acoustic liner within the fan duct to reduce sound generated by the gas turbine engines. However, the fan duct has a limited amount of space available for the acoustic liner and the heat exchangers. Moreover, in at least some known gas turbine engines, the fan ducts are reduced in size compared to prior fan ducts and even less space is available for acoustic liners and/or heat exchangers. Accordingly, a need exists for a compact apparatus that reduces noise generated during operation of turbine engines and facilitates reducing temperatures of components of the turbine engines.

BRIEF DESCRIPTION

In one aspect, an apparatus for attenuating sound waves in a gas turbine engine is provided. The apparatus includes a surface at least partially defining a pathway for airflow and a plurality of fins extending from the surface. The plurality of fins are configured to dissipate heat into the airflow. Each fin of the plurality of fins includes a fin surface. The fin surface is configured to direct the sound waves between the plurality of fins such that the plurality of fins attenuate the sound waves. The plurality of fins are arranged such that spacing between adjacent fins of the plurality of fins facilitates sound attenuation.

In another aspect, a gas turbine engine is provided. The gas turbine engine includes a nacelle housing defining an interior cavity. The gas turbine engine also includes a fan assembly positioned at least partially within the interior cavity and configured to direct airflow through the interior cavity. The gas turbine engine further includes an apparatus coupled to the nacelle housing and configured to attenuate sound waves within the interior cavity. The apparatus includes a surface at least partially defining a pathway for airflow and a plurality of fins extending from the surface. The plurality of fins are configured to dissipate heat into the airflow. Each fin of the plurality of fins includes a fin surface. The fin surface is configured to direct the sound waves between the plurality of fins such that the plurality of fins attenuate the sound waves. The plurality of fins are arranged such that spacing between adjacent fins of the plurality of fins facilitates sound attenuation.

In yet another aspect, a method of attenuating sound waves in a gas turbine engine is provided. The method includes directing airflow through an interior cavity defined by a nacelle housing of the gas turbine engine. An apparatus is coupled to the nacelle housing. The apparatus includes a plurality of fins extending from a surface of the apparatus. The method also includes directing the airflow across the surface of the apparatus such that the heat is dissipated to the air through the plurality of fins. Each fin of the plurality of fins defines a fin surface. The fin surface is configured to direct the sound waves such that the plurality of fins attenuate the sound waves. The method further includes directing the airflow between the plurality of fins. The plurality of fins are arranged such that spacing between adjacent fins of the plurality of fins facilitate sound attenuation.

DRAWINGS

These and other features, aspects, and advantages of the present disclosure will become better understood when the following detailed description is read with reference to the accompanying drawings in which like characters represent like parts throughout the drawings, wherein.

Figure 1:
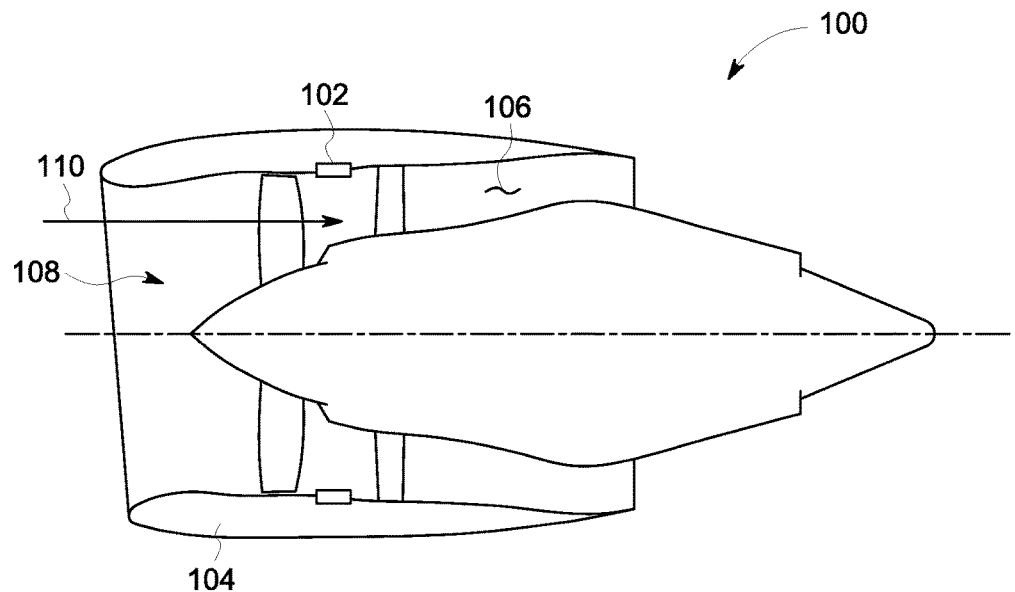
FIG. 1 is a schematic illustration of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the term "Helmholtz resonator" refers to a structure that causes gas adjacent an opening to vibrate. As used herein, the terms "attenuating", "attenuated", and "attenuate" refer to reducing the energy of sound waves.

Embodiments of the apparatus described herein include an integrated heat exchanger and sound attenuator for use with gas turbine engines. The apparatus reduces noise generated by the gas turbine engines and facilitates cooling components of the gas turbine engines. In particular, the apparatus includes heat fins that attenuate sound waves. The apparatus occupies less space than at least some known heat exchangers and acoustic liners because the apparatus integrates sound attenuation and heat transfer functions into a single structure. For example, in some embodiments, the apparatus is configured to mount to a nacelle of a turbofan engine and occupy the same amount of space as at least some known heat exchangers or acoustic liners.

FIG. 1 is a schematic illustration of an exemplary turbofan engine, broadly a gas turbine engine 100. Gas turbine engine 100 includes an apparatus 102 configured to attenuate sound waves and transfer heat. In alternative embodiments, apparatus 102 is used with any components requiring heat transfer and/or noise dampening and not necessarily with a gas turbine engine. In the exemplary embodiment, gas turbine engine 100 further includes a nacelle housing 104 that defines an interior cavity 106. A fan assembly 108 is positioned within interior cavity 106 of nacelle housing 104 and configured to direct airflow 110 through interior cavity 106. In alternative embodiments, gas turbine engine 100 includes any component that enables gas turbine engine 100 to operate as described herein.

In the exemplary embodiment, apparatus 102 is coupled to nacelle housing 104. Apparatus 102 is downstream of fan assembly 108 and is configured to transfer heat and attenuate sound waves during operation of gas turbine engine 100. Accordingly, apparatus 102 is an integrated heat exchanger and sound attenuator. For example, in some embodiments, apparatus 102 is coupled to a fluid transfer system that transfers fluid through gas turbine engine 100 to lubricate and cool components of gas turbine engine 100. Apparatus 102 is configured to remove heat from the fluid to facilitate cooling components of gas turbine engine 100. Also, in the exemplary embodiment, apparatus 102 is coupled to nacelle housing 104 such that apparatus 102 extends annularly about interior cavity 106. In alternative embodiments, apparatus 102 is coupled to any component of gas turbine engine 100 that enables gas turbine engine 100 to operate as described herein.

Figure 2:
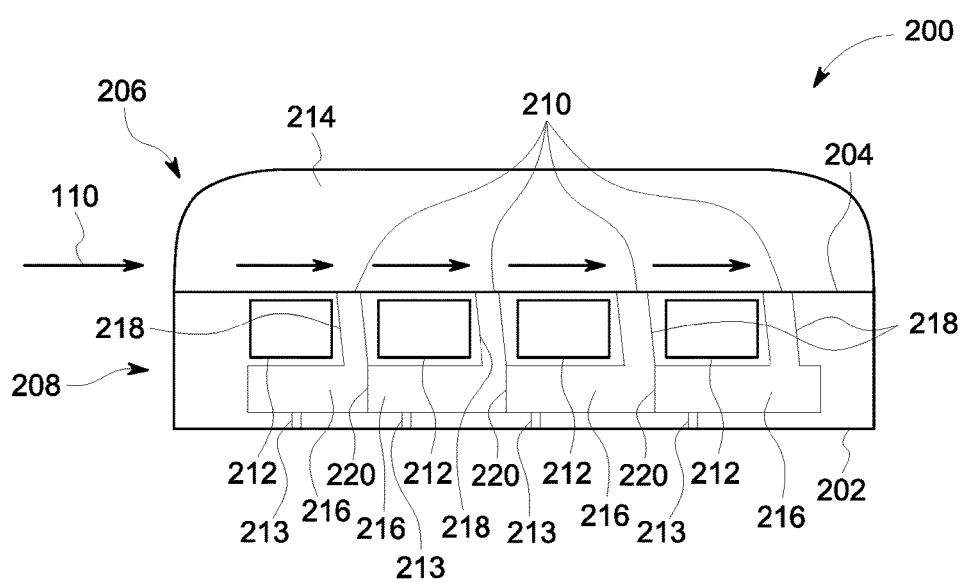
FIG. 2 is a schematic cross-sectional view of an exemplary apparatus for use with the gas turbine engine shown in FIG. 1.

FIG. 2 is a schematic cross-sectional view of an exemplary apparatus 200 for use with gas turbine engine 100 (shown in FIG. 1). Apparatus 200 includes a first surface 202, a second surface 204 opposite first surface 202, a heat exchanger 206, and an acoustic liner 208. At least a portion of heat exchanger 206 and acoustic liner 208 are positioned between first surface 202 and second surface 204. Accordingly, apparatus 200 has a compact configuration. In alternative embodiments, apparatus 200 includes any component that enables apparatus 200 to operate as described herein.

In the exemplary embodiment, first surface 202 is configured to contact nacelle housing 104 (shown in FIG. 1) when apparatus 200 is coupled to nacelle housing 104. Second surface 204 is opposite first surface 202 and at least partially defines interior cavity 106 (shown in FIG. 1) when apparatus 200 is coupled to nacelle housing 104 (shown in FIG. 1). Second surface 204 includes a plurality of openings 210. In alternative embodiments, apparatus 200 includes any surface that enables apparatus 200 to operate as described herein.

Also, in the exemplary embodiment, heat exchanger 206 includes a plurality of cooling channels 212 and a plurality of fins 214. Cooling channels 212 extend between first surface 202 and second surface 204 and are configured for heat transfer fluid to flow therethrough and toward an outlet (not shown). Fins 214 extend from second surface 204 and are coupled in thermal communication with cooling channels 212. During operation, heat from heat transfer fluid in cooling channels 212 is transferred to fins 214. Fins 214 dissipate the heat to airflow 110 adjacent second surface 204. In alternative embodiments, heat exchanger 206 has any configuration that enables apparatus 200 to operate as described herein.

In addition, in the exemplary embodiment, fins 214 extend perpendicularly from second surface 204 in uniformly spaced rows. Fins 214 extend along second surface 204 in a direction substantially perpendicular to cooling channels 212. Accordingly, each fin 214 is coupled to a plurality of cooling channels 212. Fins 214 are configured to dissipate heat from heat transfer fluid in cooling channels 212. For example, fins 214 include a thermally conductive material such as metal. In addition, fins 214 have a thin plate shape. Also, as shown in FIG. 2, fins 214 have curved ends that facilitate airflow across second surface 204. In alternative embodiments, heat exchanger 206 includes any fin that enables apparatus 200 to operate as described herein.

Moreover, in the exemplary embodiment, each cooling channel 212 has a substantially rectangular cross-sectional shape. The shape, size, and spacing of cooling channels 212 facilitates components of acoustic liner 208 extending adjacent cooling channels 212 and reduces the space occupied by apparatus 200. In alternative embodiments, apparatus 200 includes any cooling channel 212 that enables apparatus 200 to operate as described herein. For example, in some embodiments, apparatus 200 includes cylindrical pipes that form cooling channels 212.

In addition, in the exemplary embodiment, acoustic liner 208 includes a plurality of cavities 216 and a plurality of passageways 218 positioned between first surface 202 and second surface 204. Passageways 218 extend from openings 210 to cavities 216 such that openings 210 and cavities 216 are in flow communication. In particular, in the exemplary embodiment, one passageway 218 extends from each opening 210 to a respective cavity 216. Passageways 218 are elongate and extend between cooling channels 212. Accordingly, passageways 218 facilitate apparatus 200 having a reduced size and facilitate sound attenuation. In the exemplary embodiment, passageways 218 are angled. In alternative embodiments, apparatus 200 includes any passageway that enables apparatus 200 to operate as described herein.

Moreover, in the exemplary embodiment, cavities 216 are separated by a plurality of dividers 220. Each cavity 216 is configured to have a volume that is larger than a volume of a respective passageway 218. Accordingly, cavities 216, openings 210, and passageways 218 function as Helmholtz resonators. For example, during operation, at least some sound waves traveling across second surface 204 are received in openings 210 and travel through passageways 218 and into cavities 216. As a result, at least a portion of airflow 110 vibrates and the energy of sound waves adjacent second surface 204 is decreased, i.e., the sound waves are attenuated. In alternative embodiments, acoustic liner 208 includes any cavity 216 that enables acoustic liner 208 to operate as described herein. For example, in some embodiments, dividers 220 are omitted.

Figure 8:
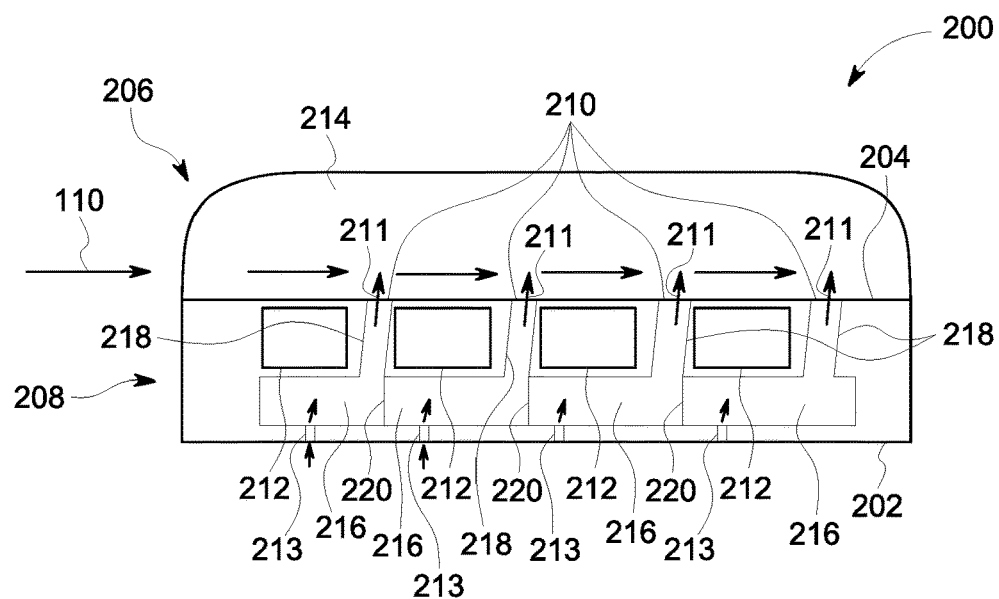
FIG. 8 is a schematic cross-sectional view of an alternative configuration of the apparatus shown in FIG. 2.

FIG. 8 is a schematic cross-sectional view of an alternative configuration of apparatus 200. In the configuration shown in FIG. 8, a bias flow 211 is directed through apparatus 200 to draw sound waves into openings 210. Bias flow 211 is directed through apparatus 200 and away from second surface 204. Bias flow 211 is provided to cavities 216 through drainage openings 213. Passageways 218 are angled in the direction of airflow 110 to direct bias flow 211 at least partially in the direction of airflow 110. In alternative embodiments, apparatus 200 utilizes any bias flow 211 that enables apparatus 200 to operate as described herein.

Figure 3:
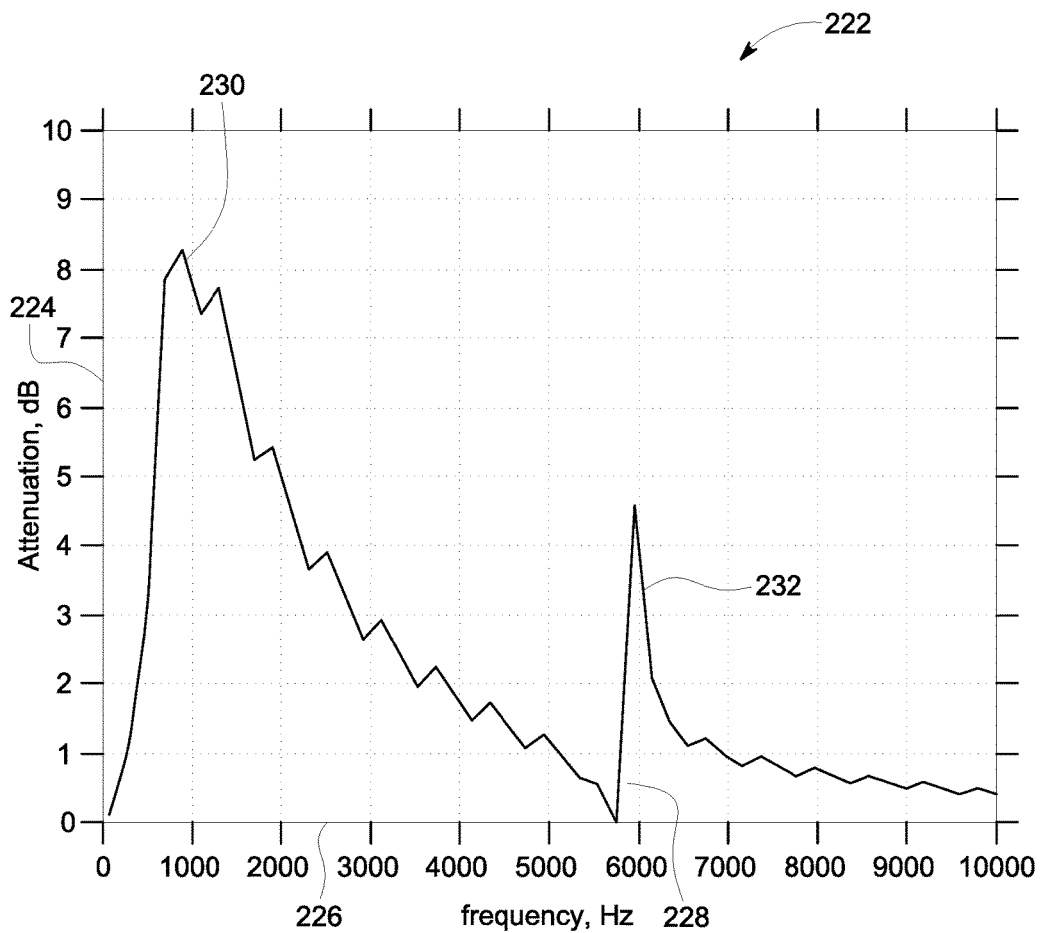
FIG. 3 is an exemplary graphical representation of sound attenuation versus frequency for sound waves traveling across the apparatus shown in FIG. 2.

FIG. 3 is an exemplary graphical representation of sound attenuation versus frequency for sound waves traveling across apparatus 200 (shown in FIG. 2). FIG. 3 includes a graph 222 including an X-axis 226 indicating frequency (Hertz (Hz)) from 0 to 10,000 in increments of 1,000 Hz and a Y-axis 224 indicating sound attenuation (decibels (dB)) from 0 to 10 in increments of 1 dB. FIG. 3 further includes a curve 228 representing sound waves interacting with apparatus 200 (shown in FIG. 2). Curve 228 has a maximum sound attenuation of approximately 8 decibels, i.e., a first peak 230. First peak 230 occurs when the sound waves have a frequency of approximately 1,000 Hz. In addition, curve 228 has a second peak 232 of approximately 4.5 dB. Second peak 232 occurs when the sound waves have a frequency of approximately 6,000 Hz. Accordingly, apparatus 200 facilitates gas turbine engines receiving sound attenuation of about 8 dB using apparatus 200 and facilitates reducing temperatures of gas turbine engine 100 (shown in FIG. 1).

Figure 4:
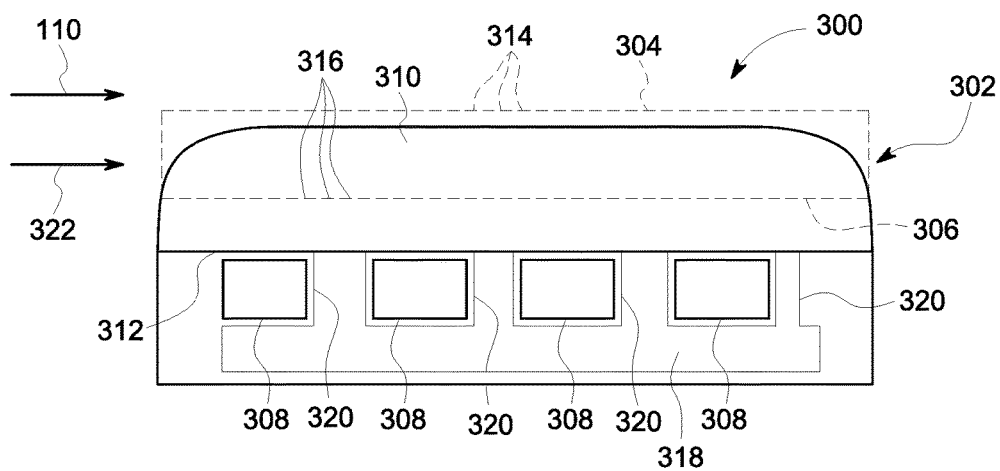
FIG. 4 is a schematic cross-sectional view of an alternative exemplary apparatus for use with the gas turbine engine shown in FIG. 1.

FIG. 4 is a schematic cross-sectional view of an exemplary apparatus 300 for use with gas turbine engine 100 (shown in FIG. 1). Apparatus 300 includes a heat exchanger 302, a first face sheet 304, and a second face sheet 306. Heat exchanger 302 includes a plurality of cooling channels 308 and a plurality of fins 310. Fins 310 extend from a surface 312 of apparatus 300. In alternative embodiments, apparatus 300 includes any component that enables apparatus 300 to operate as described herein.

Also, in the exemplary embodiment, first face sheet 304 is coupled to fins 310 opposite surface 312. Second face sheet 306 is coupled to fins 310 intermediate surface 312 and first face sheet 304. In the exemplary embodiment, first face sheet 304 defines a first set of openings 314 and second face sheet 306 defines a second set of openings 316. Openings 314 and openings 316 are defined throughout first face sheet 304 and second face sheet 306 such that first face sheet 304 and second face sheet 306 are substantially porous. In some embodiments, first face sheet 304 and/or second face sheet 306 includes a mesh. In alternative embodiments, apparatus 300 includes any face sheet that enables apparatus 300 to operate as described herein. For example, in some embodiments, first face sheet 304 and/or second face sheet 306 is omitted.

In addition, in the exemplary embodiment, apparatus 300 includes cavity 318 and passageways 320. Passageways 320 extend from surface 312 to cavity 318 to channel airflow 110 into cavity 318. In the exemplary embodiment, cavity 318 extends throughout apparatus 300 and is in fluid communication with all passageways 320. In alternative embodiments, apparatus 300 includes any passageway and cavity that enables apparatus 300 to operate as described herein.

In operation, airflow 110 and sound waves 322 travel across first face sheet 304 and second face sheet 306. First face sheet 304 and second face sheet 306 facilitate heat transfer to airflow 110 and attenuation of sound waves 322 as airflow 110 and sound waves 322 travel across first face sheet 304 and second face sheet 306. In particular, first face sheet 304 and second face sheet 306 are configured to passively absorb energy from sound waves 322 within a predetermined range of frequencies. The range of frequencies is at least partially determined by the thickness of first face sheet 304 and/or second face sheet 306. At least a portion of airflow 110 is directed through passageways 320 and into cavity 318. As a result, sound waves 322 are attenuated.

Figure 5:
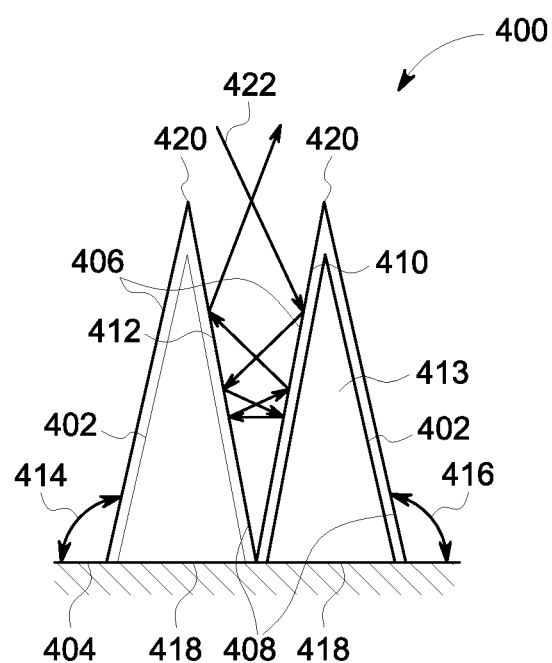
FIG. 5 is a schematic cross-sectional view of an alternative exemplary apparatus for use with the gas turbine engine shown in FIG. 1.

FIG. 5 is a schematic cross-sectional view of an exemplary apparatus 400 for use with gas turbine engine 100 (shown in FIG. 1). Apparatus 400 includes fins 402 extending from a surface 404. In reference to FIGS. 1 and 5, surface 404 of apparatus 400 is configured to couple to nacelle housing 104 of gas turbine engine 100 and at least partially define the pathway for airflow 110 within interior cavity 106 of nacelle housing 104. Apparatus 400 is configured to attenuate sound waves in gas turbine engine 100. In addition, apparatus 400 is configured to dissipate heat to airflow 110 within interior cavity 106 when apparatus 400 is coupled to nacelle housing 104. In particular, fins 402 are configured to attenuate sound waves 422 and dissipate heat to airflow 110. In the exemplary embodiment, gas turbine engine 100 does not require an acoustic liner because sound attenuation functions are performed by fins 402. In alternative embodiments, apparatus 400 is coupled to any structure that enables apparatus 400 to operate as described herein, and not necessarily a gas turbine engine.

In reference to FIG. 5, fins 402 extend from surface 404 and contact airflow 110 to dissipate heat into airflow 110. In the exemplary embodiment, each fin 402 includes a first angled wall 406 and a second angled wall 408. First angled wall 406 defines a first fin surface 410. Second angled wall 408 defines a second fin surface 412. In addition, first angled wall 406 and second angled wall 408 define a fin cavity 413 such that each fin 402 is substantially hollow. As described in more detail below, fins 402 direct sound waves 422 to reduce the energy of sound waves 422. In alternative embodiments, apparatus 400 includes any fin 402 that enables apparatus 400 to operate as described herein.

In the exemplary embodiment, first angled wall 406 and second angled wall 408 extend at angles relative to surface 404 and each other. In particular, first fin surface 410 and surface 404 form an angle 414. Second fin surface 412 and surface 404 define an angle 416. In the exemplary embodiment, angle 414 and angle 416 are obtuse, i.e., angle 414 and angle 416 are greater than 90°. In addition, angle 414 is substantially equal to angle 416 such that fin 402 is substantially symmetric about a plane extending through a root 418 and a ridge 420 of fin 402. In alternative embodiments, fin 402 extends at any angle that enables fin 402 to operate as described herein.

Also, in the exemplary embodiment, each of first angled wall 406 and second angled wall 408 extend from root 418 of fin 402 to ridge 420 of fin 402. First angled wall 406 and second angled wall 408 are coupled together at ridge 420. First angled wall 406 and second angled wall 408 are coupled to surface 404 at root 418. First angled wall 406 and second angled wall 408 are angled such that a distance between first angled wall 406 and second angled wall 408 increases from ridge 420 to root 418. Accordingly, first angled wall 406 and second angled wall 408 form a triangular prism, broadly a wedge shape. In alternative embodiments, fins 402 have any shape that enables apparatus 400 to operate as described herein.

In addition, in the exemplary embodiment, fins 402 are spaced apart a predetermined distance to facilitate sound attenuation and heat transfer. For example, in some embodiments, the distance between fins 402 is in a range of about 1 millimeter (mm) (0.04 inches (in.)) to about 6 mm (0.25 in.). The distance between fins 402 is greater at ridge 420 than at root 418. In some embodiments, fins 402 contact adjacent fins 402 at root 418. During operation, sound waves 422 are directed between fins 402 such that sound waves 422 lose energy, i.e., the sound is attenuated. For example, first fin surface 410 directs sound waves 422 towards second fin surface 412 and root 418. Second fin surface 412 directs sound waves 422 towards first fin surface 410 and roots 418. Accordingly, sound waves 422 bounce between fins 402 and are directed towards roots 418. As sound waves 422 travel towards roots 418, sound waves 422 increase in velocity. In some embodiments, sound waves 422 adjacent roots 418 are redirected towards ridges 420. Sound waves 422 are attenuated, i.e., lose energy, as a result of sound waves 422 bouncing between fins 402. In particular, energy is dissipated through friction at roots 418 where acoustic velocities are greatest.

Also, sound waves 422 are scattered by fins 402. For example, some sound waves 422 are randomly reflected by fins 402. Some reflected sound waves 422 cause a cancellation of sound waves 422 and some reflected sound waves 422 are radiated back to a source. As a result, fins 402 attenuate sound by random scattering and dissipation of sound waves 422. Accordingly, apparatus 400 does not necessarily require an acoustic resonance liner and does not rely on Helmholtz resonators.

In some embodiments, fins 402 include one or more openings to facilitate sound attenuation. For example, in some embodiments, fins 402 include an opening adjacent root 418. In further embodiments, fins 402 are substantially porous and include a plurality of openings. In addition, in some embodiments, fins 402 include at least one cavity in flow communication with the one or more openings. In alternative embodiments, fins 402 include any opening that enables apparatus 400 to operate as described herein.

Figure 6:
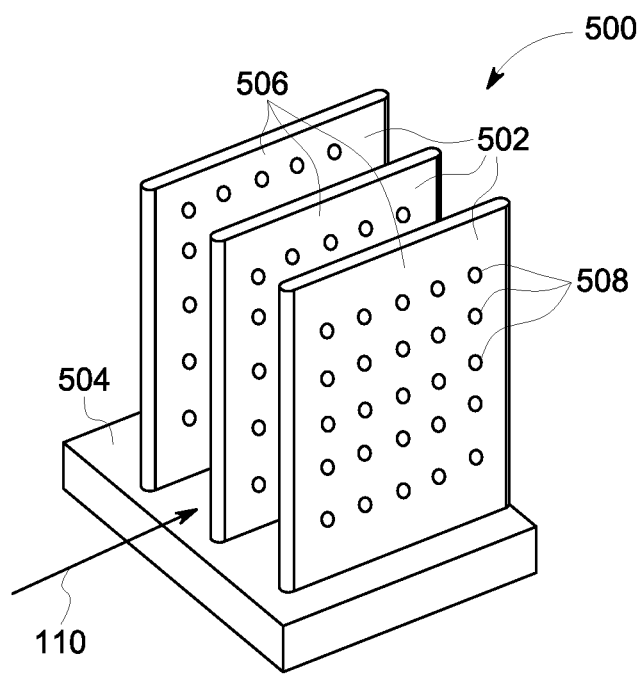
FIG. 6 is a schematic perspective view of an alternative exemplary apparatus for use with the gas turbine engine shown in FIG. 1.

FIG. 6 is a schematic perspective view of an exemplary apparatus 500 for use with gas turbine engine 100 (shown in FIG. 1). Apparatus 500 includes fins 502 extending from a surface 504. In reference to FIGS. 1 and 6, surface 504 of apparatus 500 is configured to couple to nacelle housing 104 of gas turbine engine 100 and at least partially define the pathway for airflow 110 through interior cavity 106 of nacelle housing 104. Apparatus 500 is configured to attenuate sound waves in gas turbine engine 100. In addition, apparatus 500 is configured to dissipate heat to airflow 110 within interior cavity 106 when apparatus 500 is coupled to nacelle housing 104. Accordingly, apparatus 500 provides a single structure for sound attenuation and heat transfer. In alternative embodiments, apparatus 500 is coupled to any structure that enables apparatus 500 to operate as described herein.

In reference to FIG. 6, fins 502 extend from surface 504. In the exemplary embodiment, each fin 502 includes a fin surface 506 defining a plurality of openings 508. Edges of fins 502 are rounded to reduce flow resistance. During operation, fins 502 contact airflow 110 to dissipate heat into airflow 110. In addition, fins 502 attenuate sound waves by directing the sound waves through openings 508. In alternative embodiments, apparatus 500 includes any fin 502 that enables apparatus 500 to operate as described herein.

Figure 9:
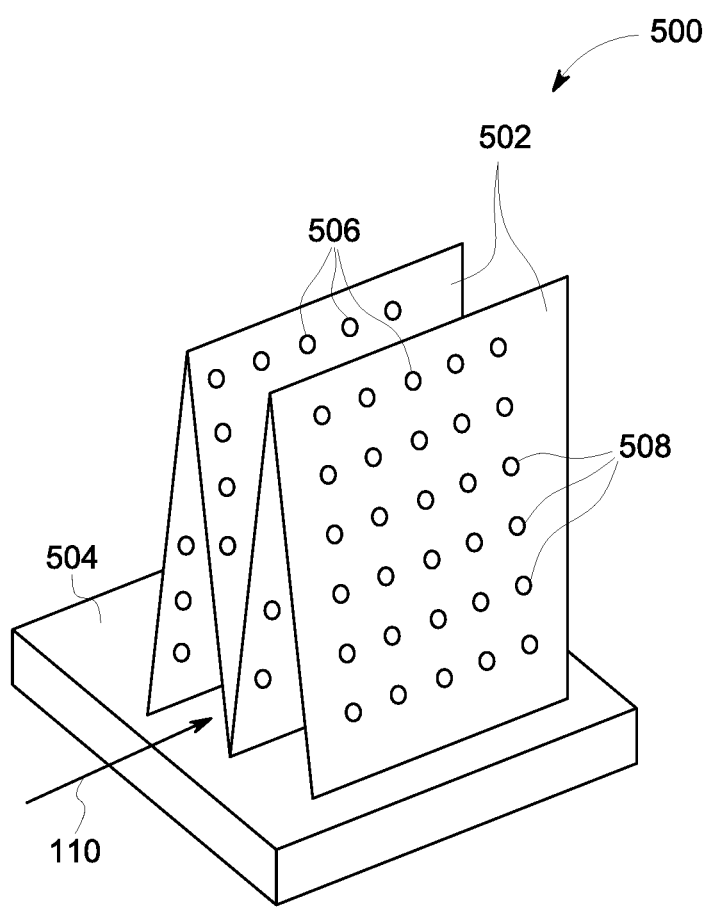
FIG. 9 is a schematic perspective view of an alternative configuration of the apparatus shown in FIG. 6.

FIG. 9 is a schematic perspective view of an alternative configuration of apparatus 500. Fins 502 extend from surface 504 at an angle. Accordingly, fins 502 form wedges. Airflow 110 flows between fins 502 and through fins 502. In addition, sound waves are scattered between fin surfaces 506 which extend at angles relative to each other and surface 504. In alternative embodiments, apparatus 500 has any configuration that enables apparatus 500 to operate as described herein.

Figure 7:
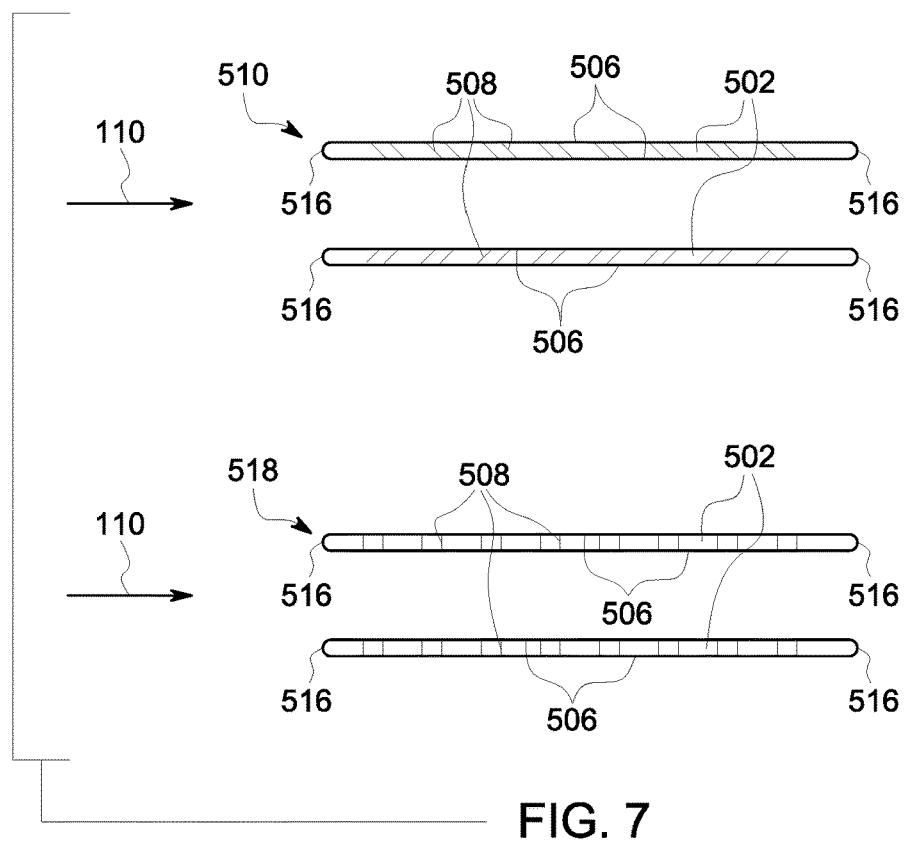
FIG. 7 is a schematic view of a plurality of configurations of fins for use with the apparatus shown in FIG. 6.

FIG. 7 is a schematic view of a plurality of configurations of fins 502 of apparatus 500 (shown in FIGS. 6 and 9). Fins 502 include fin surfaces 506 extending between ends 516. Ends 516 are at least partially angled or rounded to facilitate airflow 110 along fins 502. Fin surfaces 506 define a plurality of openings 508 therethrough. In a first configuration 510, openings 508 extend at an angle relative to fin surface 506 and partially in a direction of airflow 110. In a second configuration 518, openings 508 extend in a direction perpendicular to airflow 110.

During operation, sound waves are directed through openings 508 such that the sound waves are attenuated. For example, in some embodiments, openings 508 act as Helmholtz resonators. In further embodiments, apparatus 500 (shown in FIGS. 6 and 9) includes a material configured to absorb sound coupled to fins 502.

In alternative embodiments, fins 502 have any configuration that enables apparatus 500 (shown in FIGS. 6 and 9) to operate as described herein. For example, in some embodiments, openings 508 are arranged throughout each fin 502 such that each fin 502 is porous. In further embodiments, apparatus 500 (shown in FIGS. 6 and 9) includes fins 502 each having different configurations.

In the exemplary embodiment, fins 502 include a thermally conductive material. For example, in some embodiments, fins 502 include, without limitation, thermally conductive plastics, and/or metals. In alternative embodiments, fins 502 include any material that enables apparatus 500 to operate as described herein.

In reference to FIGS. 1 and 2, a method of attenuating sound waves in gas turbine engine 100 includes directing airflow 110 through interior cavity 106 defined by nacelle housing 104 of gas turbine engine 100 and channeling fluid through cooling channels 212 to transfer heat. The method also includes directing airflow 110 across second surface 204 of apparatus 200 such that the heat is dissipated to airflow 110 through fins 214. In some embodiments, the method includes directing airflow 110 between fins 402 (shown in FIG. 5) such that airflow 110 bounces between fins 402. The method further includes channeling airflow 110 into cavities 216 of acoustic liner 208 through openings 210 defined in second surface 204. In some embodiments, the method includes channeling airflow 110 through passageways 218 positioned between cooling channels 212 and extending between openings 210 and cavities 216. In further embodiments, the method includes directing a bias flow through passageways 218.

The above-described apparatus include an integrated heat exchanger and sound attenuator for use with gas turbine engines. The apparatus reduces noise generated by the gas turbine engines and facilitates cooling components of the gas turbine engines. In particular, the apparatus includes heat fins that attenuate sound waves. The apparatus occupies less space than at least some known heat exchangers and acoustic liners because the apparatus integrates sound attenuation and heat transfer functions into a single structure. For example, in some embodiments, the apparatus is configured to mount to a nacelle of a turbofan engine and occupy the same amount of space as at least some known heat exchangers or acoustic liners.

An exemplary technical effect of the system and methods described herein includes at least one of: (a) reducing sound generated during operation of gas turbine engines; (b) reducing temperatures of components of gas turbine engines; (c) facilitating reductions in the size of fan ducts; (d) increasing the acoustically treated surface of a fan duct; and (e) providing a sound attenuation apparatus for retrofitting to gas turbine engines.

Exemplary embodiments of a turbofan engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan engines and related methods as described herein. Rather, the exemplary embodiment can be implemented and utilized in connection with many applications where reducing noise and/or temperature of airflow is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for attenuating sound waves in a gas turbine engine, said apparatus comprising:
   a surface at least partially defining a pathway for airflow; and
   a plurality of fins extending from said surface, said plurality of fins configured to dissipate heat into the airflow, each fin of said plurality of fins including a first angled wall and a second angled wall, said first angled wall and said second angled wall of each fin of said plurality of fins forming a wedge shape, at least one of said first angled wall and said second angled wall of each fin of said plurality of fins comprising a fin surface, wherein each fin surface is configured to direct the sound waves between said plurality of fins such that said plurality of fins attenuate the sound waves, said plurality of fins arranged such that spacing between adjacent fins of said plurality of fins facilitates sound attenuation.

2. The apparatus in accordance with claim 1, wherein said plurality of fins comprise a plurality of roots adjacent said surface, and wherein said angled walls are configured to direct the sound waves towards said plurality of roots such that the sound waves increase in velocity.

3. The apparatus in accordance with claim 2, wherein each fin surface defines at least one opening adjacent said plurality of roots.

4. The apparatus in accordance with claim 1, wherein said first angled wall and said second angled wall of each fin form a triangular prism.

5. The apparatus in accordance with claim 1, wherein each fin of said plurality of fins defines a plurality of openings therein.

6. The apparatus in accordance with claim 5, wherein each fin of said plurality of fins is substantially hollow.

7. The apparatus in accordance with claim 5, wherein each plurality of openings is at least partially angled to align with a direction of airflow across said surface.

8. The apparatus in accordance with claim 5, wherein said plurality of openings extend perpendicular to a direction of airflow across said surface.

9. The apparatus in accordance with claim 1, wherein each fin of said plurality of fins further includes at least one end wall shaped to facilitate airflow across said fin.

10. A gas turbine engine comprising:
    a nacelle housing defining an interior cavity;
    a fan assembly positioned at least partially within the interior cavity and configured to direct airflow through the interior cavity; and
    an apparatus coupled to said nacelle housing and configured to attenuate sound waves within the interior cavity, said apparatus comprising:
        a surface at least partially defining a pathway for airflow; and
        a plurality of fins extending from said surface, said plurality of fins configured to dissipate heat into the airflow, each fin of said plurality of fins including a first angled wall and a second angled wall, said first angled wall and said second angled wall of each fin of said plurality of fins forming a wedge shape, at least one of said first angled wall and said second angled wall of each fin of said plurality of fins defining a fin surface, wherein each fin surface is configured to direct the sound waves between said plurality of fins such that said plurality of fins attenuate the sound waves, said plurality of fins arranged such that spacing between adjacent fins of said plurality of fins facilitates sound attenuation.

11. The gas turbine engine in accordance with claim 10, wherein said plurality of fins comprise a plurality of roots adjacent said surface, and wherein said angled walls are configured to direct the sound waves towards said plurality of roots such that the sound waves increasing in velocity.

12. The gas turbine engine in accordance with claim 10, wherein each fin of said plurality of fins defines a plurality of openings.

13. The gas turbine engine in accordance with claim 12, wherein each plurality of openings is at least partially angled to align with a direction of airflow across said surface.

14. The gas turbine engine in accordance with claim 12, wherein each fin of said plurality of fins further includes at least one end wall shaped to facilitate airflow across said fin.

15. The gas turbine engine in accordance with claim 12, wherein said plurality of openings extend perpendicular to a direction of airflow across said surface.

16. A method of attenuating sound waves in a gas turbine engine, said method comprising:
   directing airflow through an interior cavity defined by a nacelle housing of the gas turbine engine, wherein an apparatus is coupled to the nacelle housing, the apparatus including a plurality of fins extending from a surface of the apparatus;
   directing the airflow across the surface of the apparatus such that heat is dissipated to the air through the plurality of fins, each fin of the plurality of fins including a first angled wall and a second angled wall, the first angled wall and the second angled wall of each fin of the plurality of fins forming a wedge shape, at least one of the first angled wall and the second angled wall of each fin of the plurality of fins defining a fin surface, wherein each fin surface is configured to direct the sound waves such that the plurality of fins attenuate the sound waves; and
   directing the airflow between the plurality of fins, wherein the plurality of fins are arranged such that spacing between adjacent fins of the plurality of fins facilitates sound attenuation.

17. The method in accordance with claim 16 further comprising directing the airflow through a plurality of openings defined by at least one fin of the plurality of fins.

* * * * *